United States Patent [19]

Barton, Jr.

[11] Patent Number: 4,949,914

[45] Date of Patent: * Aug. 21, 1990

[54] TAPE TRANSPORT WITH RIGID ARM THREADER MECHANISM FOR LEADER BLOCK TAPE CARTRIDGE

[75] Inventor: William M. Barton, Jr., Encinitas, Calif.

[73] Assignee: Cipher Data Products, Inc., San Diego, Calif.

[*] Notice: The portion of the term of this patent subsequent to Aug. 1, 1998 has been disclaimed.

[21] Appl. No.: 375,400

[22] Filed: Jul. 3, 1989

[51] Int. Cl.$^5$ .................................... G11B 15/66
[52] U.S. Cl. ........................................ 242/195; 360/95
[58] Field of Search ............... 242/195, 197; 226/92, 226/91; 360/95

[56] References Cited

U.S. PATENT DOCUMENTS

| | | | |
|---|---|---|---|
| 3,704,942 | 12/1972 | Tsunoda | 242/195 X |
| 4,125,881 | 11/1978 | Eige et al. | 242/186 X |
| 4,243,186 | 1/1981 | Peter et al. | 242/195 |
| 4,334,656 | 6/1982 | Crawford et al. | 242/195 |
| 4,335,858 | 6/1982 | Cranna | 242/195 |
| 4,383,660 | 5/1983 | Richard et al. | 242/197 |
| 4,399,936 | 8/1983 | Rueger | 242/195 X |
| 4,452,406 | 6/1984 | Richard | 242/195 |
| 4,477,851 | 10/1984 | Dalziel et al. | 242/195 X |
| 4,608,614 | 8/1986 | Rinkleib et al. | 360/95 |
| 4,646,177 | 2/1987 | Sanford et al. | 242/195 X |
| 4,679,747 | 6/1987 | Smith | 242/195 |
| 4,681,278 | 7/1987 | Smith | 242/195 |
| 4,704,645 | 11/1987 | Murphy et al. | 360/95 |
| 4,717,090 | 1/1988 | Smith et al. | 360/95 X |
| 4,742,407 | 5/1988 | Smith et al. | 360/95 |
| 4,852,825 | 8/1989 | McGee et al. | 242/195 |

Primary Examiner—Daniel P. Stodola
Assistant Examiner—William G. Battista, Jr.
Attorney, Agent, or Firm—Baker, Maxham, Jester & Meador

[57] ABSTRACT

A tape transport for a leader block tape cartridge has a threading mechanism including a rigid threader arm and a threader pin for engaging and the leader block and extracting it from the cartridge after it has been loaded into the transport adjacent a first end of a tape path. The threading mechanism pulls the leader block along the tape path past a read/write head, and inserts the leader block into a take-up hub adjacent a second end of the tape path during a threading operation. A plurality of tape guide rollers are positioned along the tape path for engaging and guiding the oxide side of the tape once the take-up hub has pulled the tape into engagement with the gap on the read/write head. During a rewinding operation, the threading mechanism extracts the leader block from the take-up hub, pulls the leader block past the read/write head and inserts the leader block back into the cartridge. The threader arm provides a uniform constant radius threading motion to permit the leader block to be threaded in circular fashion outside the tape guide rollers and the tape head. First and second guide assemblies are provided for engaging and guiding the leader block to insure proper insertion into the cartridge and into the take-up hub.

11 Claims, 2 Drawing Sheets

FIG. 1

TAPE TRANSPORT WITH RIGID ARM THREADER MECHANISM FOR LEADER BLOCK TAPE CARTRIDGE

BACKGROUND OF THE INVENTION

The present invention relates to magnetic tape transports, and more particularly, to a mechanism for insuring proper threading of a leader block of a tape cartridge along a tape path to a take-up hub.

One magnetic tape cartridge particularly suited for storing digital data is defined in Proposed American National Standard (ANSI) X3B5/87-238. This tape cartridge contains a single reel of magnetic tape including a leader block for interfacing with an automatic threading system and is hereafter referred to as the "leader block tape cartridge." This cartridge is further illustrated and described in U.S. Pat. Nos. 4,335,858; 4,334,656; 4,383,660 and 4,452,406.

A number of tape transports have been developed that utilize the aforementioned leader block tape cartridge. One example is the IBM (Trademark) 3480 tape transport. Such drives include a mechanism for extracting the leader block, threading the tape and re-inserting the leader block back into the tape cartridge. The corner of the tape cartridge housing has a receptacle defined by upper and lower walls for removably receiving the leader block therein. This leader block is connected to the terminal end of a length of half-inch magnetic tape wound about a supply reel within the cartridge housing. Heretofore, tape transports for the leader block tape cartridge have typically utilized a threader pin whose narrow upper portion is received in the smaller upper portion of a cylindrical aperture formed in the leader block upon insertion of the cartridge into the drive. The pin or cartridge is then moved vertically so that its enlarged lower portion is captured in the lower enlarged portion of the aperture in the leader block. Thereafter the threader pin is moved horizontally by an articulated rotating arm or a guide belt to pull the leader block and the tape connected thereto along a tape path until the leader block is received in a slot formed in a take-up hub. The read/write head and take-up hub are positioned above a horizontal deck plate which typically forms a part of the frame of the tape drive.

One example of a leader block extraction, threading and insertion mechanism of the foregoing type is disclosed in U.S. Pat. No. 4,704,645 assigned to Cipher Data Products, Inc. See also U.S. Pat. Nos. 4,334,656; 4,335,858; 4,399,936; and 4,608,614 assigned to IBM, U.S. Pat. No. 4,679,747 assigned to Laser Magnetic Storage International Company and U.S. Pat. No. 4,742,407 assigned to Aspen Peripherals for further examples. Similar extracting, threading, and insertion arrangements for tape cartridges analogous to the leader block tape cartridge are shown in U.S. Pat. Nos. 4,477,851 and 4,646,177.

The magnetic tape in the leader block tape cartridge has an oxide side and a MYLAR (Trademark) side. For some time, it was assumed that any tape guide rollers could only contact the MYLAR side of the tape or else errors would be induced in the reading or writing of data on the tape. This has led to the use of complicated zig-zag tape paths and the requirement for the aforementioned complex articulated arms and timing belts for threading the leader block along a tape path. However, these complex mechanims are difficult to fit within the confines of a drive that meets the industry standard eight-inch form factor, and even more difficult to fit within a tape drive that meets the industry standard five and one-quarter-inch form factor. They are also subject to malfunctions and to wide variations in tolerances which are unacceptable in very high density recording. The MICROSTREAMER (Trademark) reel-to-reel streaming tape drive sold by Cipher Data Products, Inc. has successfully utilized tape guide rollers that contact the oxide side of the tape without inducing errors. See U.S. Pat. No. 4,243,186 granted Jan. 6, 1981 to Barton et al.

SUMMARY OF THE INVENTION

It is therefore the primary object of the present invention to provide a tape transport with an improved threading mechanism for the leader block of the tape cartridge defined in Proposed ANSI X3B5/87-238.

According to the present invention a tape transport for a leader block tape cartridge has a threading mechanism including a rigid threader arm and a threader pin for engaging and the leader block and extracting it from the cartridge after it has been loaded into the transport adjacent a first end of a tape path. The threading mechanism pulls the leader block along the tape path past a read/write head, and inserts the leader block into a take-up hub adjacent a second end of the tape path during a threading operation. A pluarlity of tape guide rollers are positioned along the tape path for engaging and guiding the oxide side of the tape once the take-up hub has pulled the tape into engagement with the gap on the read/write head. During a rewinding operation, the threading mechanism extracts the leader block from the take-up hub, pulls the leader block past the read/write head and inserts the leader block back into the cartridge. The threader arm provides a uniform constant radius threading motion to permit the leader block to be threaded in circular fashion outside the tape guide rollers and the tape head. First and second guide assemblies are provided for engaging and guiding the leader block to insure proper insertion into the cartridge and into the take-up hub.

BRIEF DESCRIPTION OF THE DRAWINGS

FIG. 1 is a plan view of a tape transport embodying a preferred embodiment of the present invention.

DESCRIPTION OF THE PREFERRED EMBODIMENT

Figure 1:
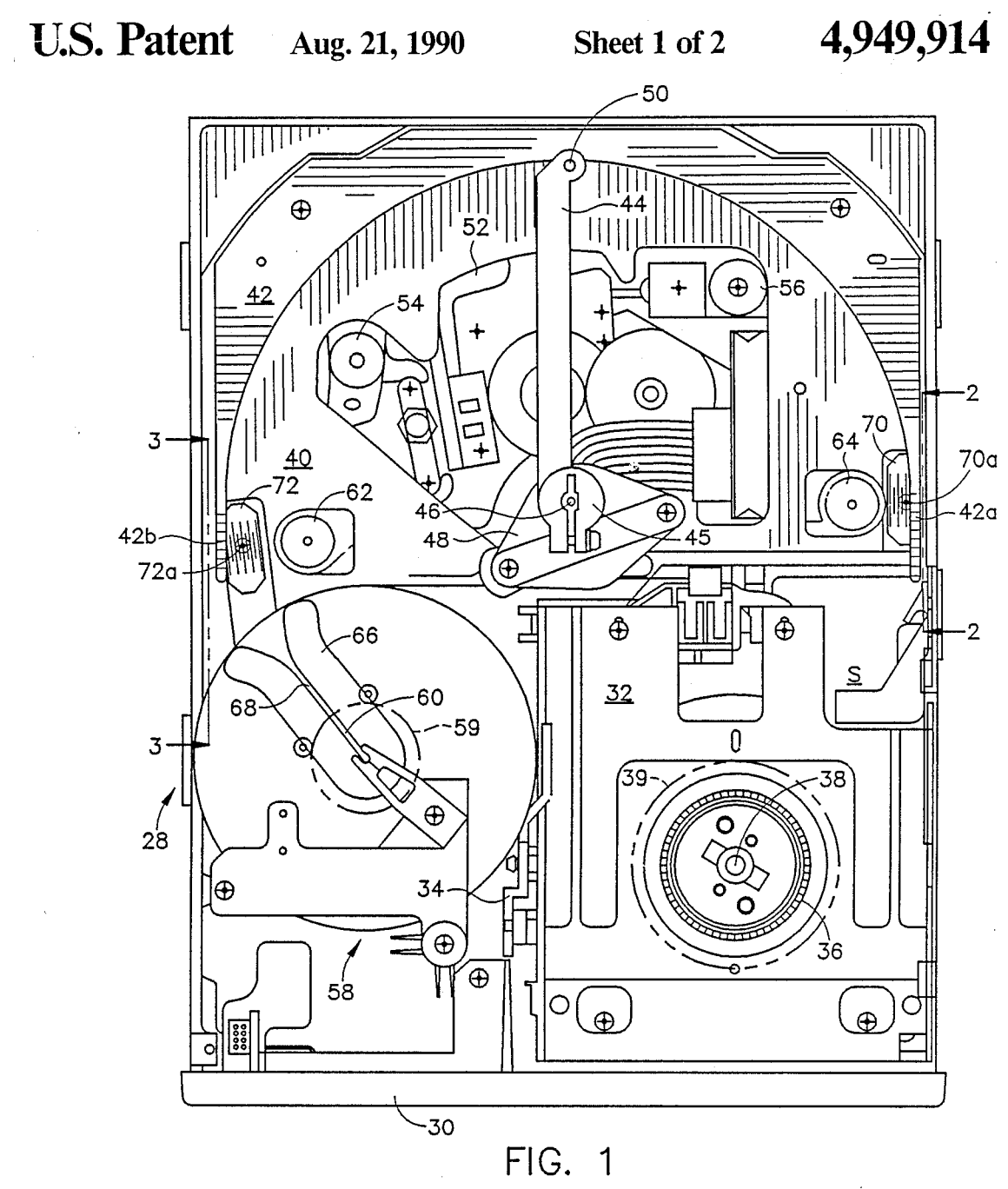
Figure 2:
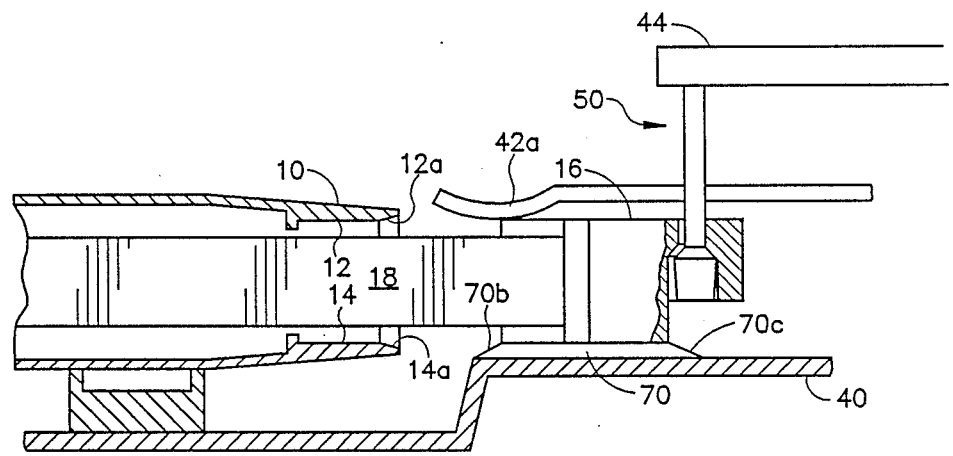
FIG. 2 is an enlarged fragmentary vertical sectional view taken along line 2—2 of FIG. 1 illustrating the insertion of the leader block back into a leader block tape cartridge which has been loaded into the tape transport of FIG. 1.

Referring to FIG. 1, a tape transport constructed in accordance with the present invention has a rectangular frame 28 dimensioned to fit the computer industry standard eight-inch form factor. The frame 28 has a front panel 30 connected to the forward transverse end of the frame. The front panel has a slot or bezel (not visible) for receiving therethrough a leader block tape cartridge not illustrated in this figure. The cartridge is slid horizontally into a carriage 32 which thereafter swings downwardly via linkage 34 to engage the serrated supply reel hub (not illustrated) of the cartridge with a toothed drive chuck 36. The drive chuck is secured to the upper end of a vertical shaft 38 of a first brushless DC motor 39 (illustrated in phantom lines) which is mounted to the frame beneath the carriage.

Continuing with FIG. 1, the rear half of the tape transport has a horizontal deck plate 40 above which is mounted an arcuate or C-shaped horizontal keeper plate 42. The keeper plate is made of a resilient flexible material such as plastic or metal. The keeper plate is generally planar in configuration and is mounted parallel to the deck plate, in spaced relation therefrom. A threader arm 44 has its inner end rigidly coupled via releasable clamp 45 to the upper end of a vertical drive shaft 46 which is rotated by motor 48 mounted to the tape transport frame. The upper end of a conventional threader pin 50 of is connected to the outer end of the threader arm 44 and extends downwardly from the same. A read/write head or transducer 52 is mounted above the deck plate between a pair of tape guide rollers 54 and 56. A take-up reel 58 is mounted to the upper end of a vertical shaft of a second brushless DC motor 59 (illustrated in phantom lines) which is mounted to the frame. The take-up reel includes a central take-up hub defining a receptacle 60 for receiving the leader block. A tape guide roller 62 is positioned along the tape path adjacent the periphery of the take-up reel 58. Another tape guide roller 64 is positioned adjacent the take-up reel and the right rear corner of the carriage 32 at the location of the corner of the tape cartridge where the tape leader block seats.

The loading sequence of the tape drive of FIG. 1 is as follows. The outer end of the threader arm 44 is initially located so that the threader pin 50 is at the position marked with the S. The leader block cartridge is inserted into the tape drive and is received in carriage 32 so that the angled corner thereof with the leader block seated therein approaches the threader pin at location S. The height of the carriage is initially such that the narrower portion of the threader pin is received in the aperture in the leader block, while the enlarged portion is below the leader block. Continued pushing in of the cartridge results in full capture of the narrow upper portion of the threader pin into the aperture in the leader block. The carriage 32 is then lowered to capture the enlarged lower portion or shoulder of the threader pin into the enlarged portion of the aperture in the leader block. During a threading operation of the tape drive, the threader arm 44 is then rotated counter-clockwise to pull the leader block, and the tape connected thereto around the tape guide rollers 64 and 56, past the read/write head 52, around the tape guide rollers 54 and 62 to the take-up reel 58.

A guide 66 mounted to the upper end of the take-up hub defines a slot 68 for receiving the upper portion of the threader pin. During the threading operation the take-up reel 58 and its guide 66 are stopped in the angular position illustrated in FIG. 1. The threader arm can then pull the leader block into the receptacle 60 in the take-up hub. The take-up reel can thereafter be rotated to wind the magnetic tape about the take-up hub 60, during which the leader block spins about the threader pin whose axis now coincides with the axis of rotation of the take-up reel.

The currents to motors 39 and 59 are controlled as is well known in the art to maintain the proper tension on the tape during writing and reading. See for example U.S. Pat. No. 4,125,881 of Eige et al. entitled "Tape Motion Control for Reel-to-Reel Drive." The oxide surface of the tape is held against the face of the read/write head 52 and against the guide rollers.

During a rewinding operation, all of the magnetic tape is unwound off of the take-up hub 60 and the hub is stopped with the guide 66 in the angular location illustrated in FIG. 1. The threader arm 44 is then rotated clockwise to pull the leader block, and the tape connected thereto, out of the receptacle 60 in the take-up hub, back around the guide rollers 62 and 54, past the read/write head 52, and then past the guide rollers 56 and 64. The leader block is then re-inserted back into the corner of the tape cartridge.

It can be seen that the rigid threader arm 44 moves the threader pin 50 along an arc radially outside of the tape path, but closely adjacent to the transducer 52 and the guide rollers. Both the threader arm drive shaft and the threader pin extend along vertical axes perpendicular to the deck plate 40.

First and second guide assemblies or means are provided for engaging and guiding the leader block to insure proper insertion into the cartridge and into the take-up hub. These are the subject of U.S. Pat. No. 4,852,825 of Jeffrey S. McGee and Thomas C. Kadien, granted Aug. 1, 1989 and entitled "Extraction and Insertion Mechanism for the Leader Block of a Tape Cartridge."

The guide means for the leader block assist in the overall threading process and their details are set forth hereafter. Friction pads 70 and 72 (FIG. 1) mounted on the deck plate 40. Spring members 42a and 42b are mounted to the frame and spaced from the friction pads 70 and 72, respectively, so that the leader block is pulled between each friction pad and its corresponding spring member. As best seen in FIG. 2, the leader block 16 engages the friction pad on a first side thereof and engages and deflects and the adjacent spring member on a second side thereof. The spring members of the first and second guide means each have an outer end which curves away from the deck plate. In the illustrated embodiment, the spring members 42a and 42b are provided by the opposite terminal ends of the resilient, flexible keeper plate 42 which is mounted to the frame in spaced relationship from the deck plate.

Figure 3:
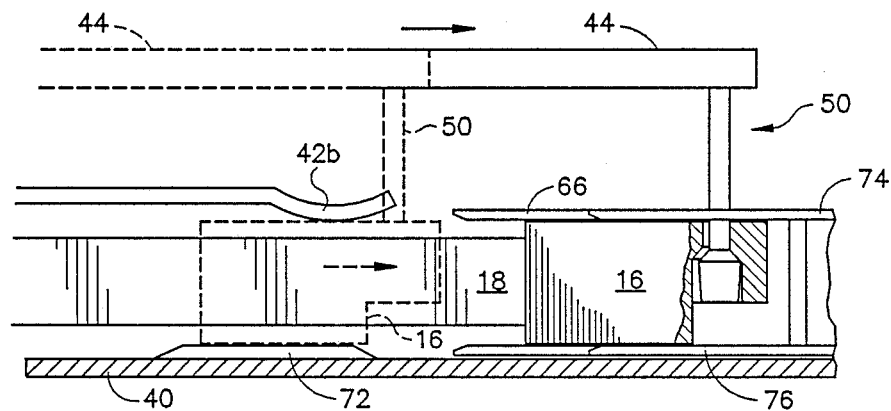
FIG. 3 is an enlarged fragmentary vertical sectional view taken along line 3—3 of FIG. 1 illustrating the insertion of the leader block into the take-up hub of the tape transport. Successive positions of the threader arm and leader block are shown in phantom lines and in solid lines, respectively.

The friction pads 70 and 72 are mounted to the upper surface of the deck plate 40 by screws 70a and 72a (FIG. 1). Alternatively, the friction pads may be raised integral portions of a die cast deck plate which are later machined down to achieve the precise height required. As illustrated by the vertical lines in FIG. 1, the friction pads may have parallel serrations or grooves formed therein primarily for aesthetic reasons, i.e. they will continue to appear shiny even after repeated engagement and wear from the leader block. As best seen in FIG. 2, preferably the leading and trailing edges of the friction pads are beveled at 70b and 70c to provide a smooth guiding action between the pad and the adjacent spring member. The combination of spring member 42a and friction pad 70 is positioned near the corner of the tape cartridge having the leader block when the cartridge is first inserted into the drive into carriage 32. This spatial relationship is visible in FIGS. 1 and 2. The combination of spring member 42b and friction pad 72 is positioned adjacent the outer periphery of the take-up reel 58 for guiding the leader block between the upper and lower reel flanges 74 and 76 (FIG. 3) and into the receptacle 60 in the take-up hub of this reel. Successive positions of the threader arm 44, threader pin 50 and leader block 16 during the threading operation are shown in phantom and then solid lines in FIG. 3.

While I have described a preferred embodiment of my mechanism for threading the leader block of a tape cartridge, it should be understood that modifications and adaptations thereof will occur to persons skilled in the art. Therefore, the protection afforded my invention should only be limited in accordance with the scope of the following claims.

I claim:

1. A transport for a leader block tape cartridge, comprising:
   a generally rectangular frame;
   means for receiving and supporting the cartridge within the frame;
   a supply reel motor mounted to the frame;
   first drive means connected to the supply reel motor and engageable with a supply reel inside the cartridge for rotating the same;
   a take-up motor mounted to the frame;
   a take-up hub;
   second drive means connected to the take-up motor for rotating the take-up hub;
   a magnetic tape transducer assembly mounted to the frame between the take-up hub and the cartridge when the cartridge is inserted in the frame; and
   tape threading means for extracting a leader block from the cartridge, pulling the leader block past the transducer assembly, and inserting the leader block into the take-up hub so that a length of tape attached to the leader block will be threaded along a tape path during a threading operation, and for extracting the leader block from the take-up hub, pulling the leader block past the transducer assembly and inserting the leader block into the cartridge during a rewinding operation, including a rigid non-articulating threader arm having inner and outer ends, a threader pin directly connected in a fixed manner to the outer end of the threader arm for engaging the leader block, and means connected to the inner end of the threader arm for rotating the threader arm to move the pin along an arc radially outside of the tape path.

2. A transport according to claim 1 wherein the tape threading means further includes first guide means connected to the frame adjacent the cartridge supporting means for engaging and guiding the leader block to ensure proper insertion thereof back into the cartridge during the rewinding operation.

3. A transport according to claim 2 wherein the frame includes a deck plate adjacent to which the leader block is pulled.

4. A transport according to claim 1 wherein the tape threading means further includes second guide means connected to the frame adjacent the take-up hub for engaging and guiding the leader block to ensure proper insertion thereof into the take-up hub during the threading operation.

5. A transport according to claim 1 wherein the means for supporting the inner end of the threader arm includes a drive shaft and a motor for rotating the drive shaft.

6. A transport according to claim 5 wherein the inner end of the threader arm is removeably connected to the drive shaft by a releasable clamp.

7. A transport according to claim 1 and further comprising a plurality of guide rollers mounted along the tape path for engaging an oxide side of the tape.

8. A transport according to claim 7 wherein the drive shaft and the threader pin both extend generally perpendicular to a deck plate portion of the frame adjacent to which the leader block is pulled.

9. A transport according to claim 1 wherein the tape threading means further includes first guide means connected to the frame adjacent the cartridge supporting means for engaging and guiding the leader block to ensure proper insertion thereof back into the cartridge during the rewinding operation and second guide means connected to the frame adjacent the take-up hub for engaging and guiding the leader block to ensure proper insertion thereof into the take-up hub during the threading operation.

10. A transport according to claim 9 wherein the first and second guide means each include a corresponding friction pad mounted to a deck plate connected to the frame and an opposing spring member connected to the frame and spaced above the friction pad for deflecting and guiding the leader block between the friction pad and the spring member.

11. A transport for a leader block tape cartridge, comprising:
   a generally rectangular frame including a horizontal deck plate defining a tape path;
   a carriage for receiving and supporting the cartridge within the frame adjacent a first end of the tape path;
   a supply reel motor mounted to the frame beneath the carriage;
   a drive chuck connected to a shaft of the supply reel motor and engageable with a supply reel inside the cartridge for rotating the same when the cartridge is received in the carriage;
   a take-up motor mounted to the frame;
   a take-up hub connected to a shaft of the take-up motor adjacent a second end of the tape path;
   a read/write head mounted above deck plate between the first and second ends of the tape path;
   a threading mechanism including a rigid non-articulating threader arm, a threader pin directly mounted in a fixed manner to an outer end of the threader arm for engaging the leader block, and a motor drive connected to an inner end of the threader arm and to the frame for rotating the threader arm for extracting the leader block from the cartridge, pulling the leader block along the tape path past the read/write head, and inserting the leader block into the take-up hub during a threading operation, and for extracting the leader block from the take-up hub, pulling the leader block past the read/write head and inserting the leader block into the cartridge during a rewinding operation.

* * * * *